Patented June 18, 1929.

1,717,951

UNITED STATES PATENT OFFICE.

GUY B. TAYLOR, OF WILMINGTON, DELAWARE, ASSIGNOR TO E. I. DU PONT DE NEMOURS & COMPANY, OF WILMINGTON, DELAWARE, A CORPORATION OF DELAWARE.

METHOD OF PRODUCING NITROSYL HALIDE.

No Drawing. Application filed March 28, 1927. Serial No. 179,183.

This invention relates to a method of producing halides of nitrous acid and more particularly to the production of nitrosyl chloride.

It is known that the cloride of nitrous acid, nitrosyl chloride (NOCl), may be prepared by the direct action of nitric oxide and chlorine, thus:

$$2NO + Cl_2 = 2NOCl.$$

Nitrosyl chloride likewise results when a mixture of hydrochloric acid and nitrous acid is slightly heated:

$$HNO_3 + 3HCl = NOCl + Cl_2 + 2H_2O.$$

It is also formed by the action of phosphorus pentachloride on potassium nitrite according to the reaction:

$$PCl_5 + KNO_2 = NOCl + KCl + POCl_3.$$

From the standpoint of practical operation none of these methods is to be recommended, however, in part because of the cost of raw materials and in part because of the difficulty of separating the desired product from the other product or products of the reaction.

It is the object of the present invention to provide an improved method for producing nitrosyl chloride, and other halides of nitrous acid, the method being characterized by the ready availability of raw materials required, simplicity and smoothness of operation, and ease of recovery of the nitrosyl halide.

Other objects and advantages of the invention will be apparent as it is better understood from the following specification, in which its preferred embodiments are described.

I have discovered that nitrosyl halide containing substantially no free halogen may be prepared by the reaction of nitrogen peroxide upon an aqueous solution of an alkali metal or alkaline earth metal halide when the hydrogen halide concentration of said solution is less than the value corresponding to a vapor pressure of 1 mm. of mercury. For any particular case the optimum acid concentration depends upon the temperature at which it is desired to carry out the reaction. The following equation represents the course of the chemical reaction:

$$2NO_2 + KCl = KNO_3 + NOCl.$$

According to the invention nitrogen peroxide, mixed with air or other carrier gas if desired, is passed into contact with a slightly acid solution of the metal halide. The nitrogen peroxide interacts with the halide in accordance with the above chemical reaction, with evolution of nitrosyl halide and simultaneous formation of metal nitrate. The former is recovered from the effluent gases by any suitable method, preferably by condensation. A valuable by-product of the process is the nitrate which may be recovered from solution by crystallization. This is effected with particular ease in the case that potassium halide is the starting point of the process, since potassium nitrate at low temperatures is less soluble than the corresponding halides and separates from the solution in a relatively pure state when the solution is cooled a few degrees.

Although the invention is not limited to operation at any particular temperature or range of temperatures, I prefer to carry out the process at a temperature of from 0° to 50° C.

The acid concentration which is necessary to the efficient carrying out of the process may be maintained in any desired way but in putting the process to practical use I prefer to employ a circulatory process. That is, starting with a saturated solution of halide, potassium chloride for example, the solution is first treated with nitrogen peroxide, the potassium nitrate thereby formed is recovered, and the acid residual liquor is re-saturated with potassium chloride and treated again with nitrogen peroxide. This is followed by removal of potassium nitrate by crystallization, re-saturation of the solution with potassium chloride, retreatment with nitrogen peroxide and so on. In this way, the process may be carried out in a continuous manner and with relative freedom from practical operating difficulties.

The following example will serve to illustrate the preferred method of operation, it being understood, however, that the invention is not limited to the details of the operation as herein set forth.

The apparatus used in the process is simple in form and easy of construction, consisting of a cylindrical glass tube 1 inch in diameter and 30 inches in length, the tube being filled with glass rings ¼ inch x ¼ inch. This tube, hereinafter referred to as the tower, is provided with a water-jacket for controlling the temperature of the reaction. Provision is made at the bottom of the tower for a gas inlet, as well as for a discharge for the liquid. An inlet for the liquid is arranged at the top of the tower. The nitrogen peroxide used in the process may be derived from any suitable source but for convenience I prefer to prepare it by the oxidation of ammonia by the known method of passing air and ammonia into contact with a heated platinum gauze. A gaseous mixture prepared in this way and consisting of air with about 6% by volume of nitrogen peroxide is passed into the gas inlet at the bottom of the tower at the rate of about 2400 cc. per minute. Initially a solution of potassium chloride (saturated at 20° C.) is fed in at the top of the tower at the rate of about 25 cc. per minute. The temperature of the tower is maintained within the range of 10° to 50° C. by suitably controlling the flow of water in the cooling jacket. The solution issuing from the bottom of the tower is cooled to 0° C. whereupon potassium nitrate separates from the solution and is collected by filtration. The residual liquor is resaturated with potassium chloride at 20° C. and is used thereafter in place of the potassium chloride solution originally introduced at the top of the tower. When the process is carried out under these conditions the maintenance of the desired hydrochloric acid concentration in the tower is assured. The effluent gases are led to a recovery apparatus wherein the nitrosyl chloride is condensed and withdrawn in the liquid state, or absorbed in a suitable solvent.

As has been previously indicated, the process of the invention is susceptible of application to the preparation of other nitrosyl halides, such as nitrosyl bromide, etc., and as substitutes for potassium the halide salts of other members of the alkali metal or alkaline earth metal groups may be employed. For the purposes of this invention the term "alkali halide" is used to characterize the halides of metals of the alkali and alkaline earth metal groups.

Various changes may be made in the details of the method as described without departing from the invention or sacrificing any of the advantages thereof.

I claim:

1. The method of producing nitrosyl halide which consists in causing nitrogen peroxide to react with an acid aqueous solution of alkali halide, the hydrogen halide concentration of said solution being less than that corresponding to a hydrogen halide vapor pressure of 1 mm. of mercury.

2. The method of producing nitrosyl chloride which consists in causing nitrogen peroxide to react with an aqueous solution of potassium chloride, the hydrogen halide concentration of said solution being less than that corresponding to a hydrogen halide vapor pressure of 1 mm. of mercury.

In testimony whereof I affix my signature.

GUY B. TAYLOR.